US010089716B2

(12) United States Patent
Chandra et al.

(10) Patent No.: US 10,089,716 B2
(45) Date of Patent: Oct. 2, 2018

(54) GENERATING REAL-TIME SENSOR MAPS FROM VIDEOS AND IN-GROUND SENSOR DATA (71) Applicant: Microsoft Technology Licensing, LLC, Redmond, WA (US)

(72) Inventors: Ranveer Chandra, Kirkland, WA (US); Ashish Kapoor, Kirkland, WA (US); Sudipta Sinha, Redmond, WA (US); Deepak Vasisht, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/256,566

(22) Filed: Sep. 3, 2016

(65) Prior Publication Data
US 2018/0068416 A1    Mar. 8, 2018

(51) Int. Cl.
*G06K 9/00* (2006.01)
*G06T 3/40* (2006.01)
(Continued)

(52) U.S. Cl.
CPC .......... *G06T 3/4038* (2013.01); *A01B 79/005* (2013.01); *B64C 39/024* (2013.01);
(Continued)

(58) Field of Classification Search
CPC combination set(s) only.
See application file for complete search history.

(56) References Cited

U.S. PATENT DOCUMENTS 6,834,128 B1 * 12/2004 Altunbasak ............ G06K 9/228
348/49
8,731,836 B2    5/2014 Lindores et al.
(Continued)

FOREIGN PATENT DOCUMENTS

EP    1234278 A1    8/2002
EP    2882140 A1    6/2015
(Continued)

OTHER PUBLICATIONS

Rasmussen, et al., "Gaussian Processes for Machine Learning", In Publication of the MIT Press, Nov. 2005, 266 pages.
(Continued)

*Primary Examiner* — Alex Liew
(74) *Attorney, Agent, or Firm* — Fountainhead Law Group P.C.

(57) ABSTRACT

An apparatus for generating precision maps of an area is disclosed. The apparatus receives sensor data, where the sensor data includes sensor readings each indicating a level of a parameter in one of a plurality of first portions of an area, and video data representing an aerial view of the area. The sensor data may be received from sensors that are each deployed in one of the first portions of the area. The video data may be received from an aerial vehicle. An orthomosaic may be generated from the video data, and the orthomosaic and the sensor data used to generate a predication model. The prediction model may then be used to extrapolate the sensor data to determine a level of the parameter in each of a plurality of second portions of the area. A precision map of the area may be generated using the extrapolated sensor readings.

22 Claims, 6 Drawing Sheets (51) Int. Cl.

| | |
|---|---|
| *B64C 39/02* | (2006.01) |
| *G06K 9/62* | (2006.01) |
| *G06T 3/00* | (2006.01) |
| *G06T 7/00* | (2017.01) |
| *A01B 79/00* | (2006.01) |
| *G01C 11/02* | (2006.01) |

(52) U.S. Cl.
CPC .......... *G01C 11/025* (2013.01); *G06K 9/0063* (2013.01); *G06K 9/6215* (2013.01); *G06T 3/0068* (2013.01); *G06T 3/0093* (2013.01); *G06T 7/0028* (2013.01); *G06T 7/0034* (2013.01); *B64C 2201/127* (2013.01); *G06T 2207/10032* (2013.01); *G06T 2207/30188* (2013.01); *G06T 2207/30192* (2013.01)

(56) References Cited

U.S. PATENT DOCUMENTS

| | | | |
|---|---|---|---|
| 9,058,633 | B2 | 6/2015 | Lindores et al. |
| 2004/0001705 | A1* | 1/2004 | Soupliotis .......... H04N 5/23248 386/242 |
| 2007/0208510 | A1 | 9/2007 | Anderson et al. |
| 2007/0291994 | A1* | 12/2007 | Kelle ...................... G01C 11/00 382/110 |
| 2010/0238164 | A1 | 9/2010 | Steedly et al. |
| 2012/0101784 | A1 | 4/2012 | Lindores et al. |
| 2012/0114229 | A1 | 5/2012 | Zhou |
| 2014/0136286 | A1 | 5/2014 | Hovis et al. |
| 2014/0136952 | A1 | 5/2014 | Zhu et al. |
| 2014/0340489 | A1 | 11/2014 | Medioni et al. |
| 2014/0380264 | A1 | 12/2014 | Misra et al. |
| 2015/0187109 | A1 | 7/2015 | Mentzer |
| 2015/0363641 | A1* | 12/2015 | Navulur .............. G06K 9/00476 382/113 |
| 2015/0379702 | A1 | 12/2015 | Ulman |
| 2016/0050840 | A1 | 2/2016 | Sauder et al. |
| 2016/0300375 | A1* | 10/2016 | Beckett ................. G06T 3/4092 |
| 2017/0038749 | A1* | 2/2017 | Mewes ................ G05B 19/042 |

FOREIGN PATENT DOCUMENTS

| | | |
|---|---|---|
| EP | 3046066 A1 | 7/2016 |
| WO | 2012092794 A1 | 7/2012 |

OTHER PUBLICATIONS

Roberts, et al., "Connecting africa using the tv white spaces: From research to real world deployments", In Proceedings of the 21st IEEE International Workshop on Local and Metropolitan Area Networks, Apr. 22, 2015, 6 pages.

Ruiz-Garcia, et al., "A review of wireless sensor technologies and applications in agriculture and food industry: State of the art and current trends", In Journal of Sensors, vol. 9, Issue 6, Jun. 16, 2009, pp. 4728-4750.

Rosegrant, et al., "Food Security in a World of Natural Resource Scarcity: The role of agricultural technologies", In Publication of International Food Policy Research Institute, Feb. 12, 2014, 251 pages.

Sabri, et al., "Wireless Sensor Network Wave Propagation in Vegetation", In Publication of Springer, Dec. 28, 2014.

Schepers, et al., "Appropriateness of management zones for characterizing spatial variability of soil properties and irrigated corn yields across years", In Agronomy Journal, vol. 96, No. 1, Jan. 2004, pp. 195-203.

Schimmelpfennig, David, "Cost Savings from Precision Agriculture Technologies on U.S. Corn Farms", Published on: May 2, 2016 Available at: http://www.ers.usda.gov/amber-waves/2016-may/cost-savings-from-precision-agriculture-technologies-on-us-corn-farms.aspx#.V2kKXfl94dV.

"Campbell Scientific", Retrieved on: Jun. 21, 2016, Available at: https://www.campbellsci.com/products.

Selavo, et al., "Luster: wireless sensor network for environmental research", In Proceedings of the 5th international conference on Embedded networked sensor systems, Nov. 6, 2007, pp. 103-116.

"SenseFly", Retrieved on: Jun. 21, 2016, Available at: https://www.sensefly.com/home/html.

Shamos, Michael Ian, "Computational Geometry", In Dissertation of Yale University, May 1978, 244 pages.

"SIGFOX", Retrieved on: Jun. 21, 2016, Available at: http://www.sigfox.com/.

Sinha, et al., "Pan-tilt-zoom camera calibration and high-resolution mosaic generation", In Journal of Computer Vision and Image Understanding, vol. 103, Issue 3, Sep. 2006, pp. 1-20.

Soderstrom, et al., "Adaptation of regional digital soil mapping for precision agriculture", In International Journal on Advances in Precision Agriculture, Feb. 27, 2016, 20 pages.

Stafford, J.V., "Precision Agriculture", In Publication of Wageningen Academic Publishers, Jun. 30, 2005.

Szeliski, Richard, "Image alignment and stitching: A tutorial", In Technical report of MSR-TR-2004-92, Oct. 2004, 89 pages.

Szeliski, et al., "Fast Poisson Blending using Multi-Splines", In Proceedings of IEEE International Conference on Computational Photography, Apr. 2011, 8 pages.

Wark, et al., "Transforming agriculture through pervasive wireless sensor networks", In Journal of IEEE Pervasive Computing, vol. 6, Issue 2, Apr. 2007, pp. 50-57.

"The Weather Channel", Retrieved on: Jun. 21, 2016, Available at: https://weather.com/.

"Food production must double by 2050 to meet demand from worlds growing population, innovative strategies needed to combat hunger, experts tell second committee", In Proceedings of Sixty-fourth General Assembly, Oct. 9, 2009, 4 pages.

Werner-Allen, et al., "Fidelity and yield in a volcano monitoring sensor network", In Proceedings of the 7th symposium on Operating systems design and implementation, Nov. 6, 2006, pp. 381-396.

Xu, et al., "Performance evaluation of color correction approaches for automatic multi-view image and video stitching", In Proceedings of IEEE Conference on Computer Vision and Pattern Recognition, Jun. 13, 2010, pp. 263-270.

Zhang, et al., "The application of small unmanned aerial systems for precision agriculture: a review", In International Journal on Advances in Precision Agriculture, vol. 13, Issue 6, Dec. 2012.

Mcbratney et. al., Estimating Average and Proportional Variograms of Soil Properties and Their Potential Use in Precision Agriculture, Precision Agriculture pp. 125-152,. published by Kluwer Academic Publishers, 1999.

Hartley et. al., Multiple View Geometry in computer Vision, pp. 1-655, published by Cambridge University Press, 2000.

Stafford, Precision Agriculture '05, pp. 1-1005, Wageningen Academic Publishers, published 2005.

Zhang et. al., The Application of Small Unmanned Aerial Systems for Precision Agriculture, Precision Agriculture, pp. 693-712, published Jul. 2012.

Sabri et. al., Wireless Sensor Network Wave Propagation in Vegetation, ResearchGate at https://www.researchgate.net/publication/305760347, pp. 283-298, published Aug. 2016.

"Drones for Agriculture", Retrieved on: Aug. 5, 2016 Available at: https://www.sensefly.com/applications/agriculture.html.

"Agriculture: Risk Management Use Case", Published on: Jan. 21, 2016 Available at: http://www.giscloud.com/blog/agriculture-risk-management-use-case/.

"Albris The intelligent mapping & inspection drone", Retrieved on: Aug. 5, 2016 Available at: https://www.sensefly.com/drones/albris.html.

Pullano, Gary, "Drones seen as a method to manage fruit production", Published on: Apr. 2, 2015 Available at: http://fruitgrowersnews.com/article/drones-seen-as-a-method-to-manage-fruit-production/.

Colomina, et al., "Unmanned aerial systems for photogrammetry and remote sensing: A review", In ISPRS Journal of Photogrammetry and Remote Sensing, vol. 92, Jun. 2014, pp. 79-97.

(56) References Cited

OTHER PUBLICATIONS

"UAV- / Drone-based Precision Agriculture & Smart Farming", Published on: May 6, 2015 Available at: http://www.asctec.de/en/uav-drone-based-precision-agriculture-smart-farming/.

Coopersmith, et al., "Using similarity of soil texture and hydroclimate to enhance soil moisture estimation", In Journal of Hydrology Earth System Sciences, vol. 18, Aug. 20, 2014, pp. 3095-3107.

Satyanarayanan, et al., "Edge Analytics in the Internet of Things", In Journal of IEEE Pervasive Computing, vol. 14, No. 2, Apr. 2015, pp. 24-31.

Lenz, Gadi, "The Data of Things: How Edge Analytics and IoT Go Hand in Hand", Published on: Sep. 22, 2015 Available at: http://www.datanami.com/2015/09/22/the-data-of-things-how-edge-analytics-and-iot-go-hand-in-hand/.

Raphael, Chris, "IoT Architectures for Edge Analytics", Published on: Nov. 21, 2015 Available at: http://www.rtinsights.com/iot-architectures-for-edge-analytics/.

Collett, Stacy, "Cloud vs Edge in an IoT world", Published on: Apr. 27, 2016 Available at: https://iotworldnews.com/2016/04/cloud-vs-edge-in-an-iot-world/.

"Explaining the Internet of Things Ecosystem and Taxonomy", Retrieved on: Jun. 13, 2016 Available at: https://451research.com/images/Marketing/IoT/IoT_Taxonomy_12.1.15.pdf.

"The Internet of Things Reference Model", In White Paper of Cisco, Jun. 4, 2014, pp. 1-12.

Madabushi, Vasu, "Compute at the IoT edge: A real necessity today", Published on: May 11, 2016 Available at: https://iotworldnews.com/2016/05/compute-at-the-iot-edge-a-real-necessity-today/.

Loke, Seng Wai, "The Internet of Flying-Things: Opportunities and Challenges with Airborne Fog Computing and Mobile Cloud in the Clouds", In Proceedings of Computing Research Repository, Jul. 2015, pp. 1-5.

McKinney, David, "New Intel Internet of Things Platform Connects the Unconnected", Published on: Dec. 15, 2014 Available at: https://blogs.intel.com/iot/2014/12/15/new-intel-iot-plafform-connects-unconnected-internet-things/.

"IEEE Standard", Retrieved on: Jun. 20, 2016 Available at: https://standards.ieee.org/findstds/standard/802.11af-2013.html.

Lee, et al., "Sensing technologies for precision specialty crop production", In Journal of Computers and Electronics in Agriculture, vol. 74, Issue 1, Oct. 2010, pp. 2-33.

"Adaptrum", Retrieved on: Jun. 20, 2016 Available at: http://www.adaptrum.com/.

Andrade-Sanchez, et al., "Performance assessment of wireless sensor networks in agricultural settings", In Proceedings of ASABE Annual International Meeting, Technical Papers, Jun. 2007.

Baggio, Aline, "Wireless sensor networks in precision agriculture", In Proceedings of ACM Workshop on Real-World Wireless Sensor Networks, Jun. 2005, 2 pages.

Bahl, et al., "White space networking with wi-fi like connectivity", In Journal ACM SIGCOMM Computer Communication Review, vol. 39, Issue 4, Aug. 17, 2009, pp. 27-38.

Botterill, et al., "Real-time aerial image mosaicing", In Proceedings of 25th International Conference of Image and Vision Computing New Zealand, Nov. 2010, 8 pages.

Brown, et al., "Automatic Panoramic Image Stitching using Invariant Features", In Proceedings of International Journal of Computer Vision, vol. 74, Issue 1, Aug. 2007, pp. 59-73.

Cai, et al., "The stitching of aerial videos from UAVs", In Proceedings of 28th International Conference on Image and Vision Computing New Zealand, Nov. 27, 2013, pp. 448-452.

G. Cassman, Kenneth, "Ecological intensification of cereal production systems: Yield potential, soil quality, and precision agriculture", In Proceedings of the National Academy of Sciences, vol. 96, Issue 11, May 1999, pp. 5952-5959.

"Connected Farm", Retrieved on: Jun. 21, 2016 Available at: https://www.connectedfarm.com/.

"DataMapper Inflight", Retrieved on: Jun. 21, 2016 Available at: http://www.precisionhawk.com/datamapperinflight.

"John Deere Field Connect", Retrieved on: Jun. 21, 2016 Available at: https://www.deere.com/en_US/products/equipment/ag_management_solutions/field_and_crop_solutions/john_deere_field_connect/john_deere_field_connect.page.

"John Deere Sensors", Retrieved on: Jun. 21, 2016 Available at: https://www.deere.com/en_US/products/equipment/sensors/sensors.page.

"DJI Developer", Retrieved on: Jun. 21, 2016 Available at: https://developer.dji.com/.

"DroneDeploy", Retrieved on: Jun. 21, 2016 Available at: https://dronedeploy.com/.

"Precision Maps", Retrieved on: Jun. 17, 2016 Available at: http://www.farms.com/precision-agriculture/precision-maps/.

Franco, et al., "Energy-aware coverage path planning of UAVS", In Proceedings of IEEE International Conference on Autonomous Robot Systems and Competitions, Apr. 8, 2015, pp. 111-117.

"FreeWave", Retrieved on: Jun. 16, 2016 Available at: http://www.freewave.com/.

Godfray, et al., "Food security: The challenge of feeding 9 billion people", In Journal of Science, vol. 327, Issue 5967, Feb. 12, 2010, pp. 812-818.

Hartley, et al., "Multiple View Geometry in Computer Vision", In Publication of Cambridge University Press, Mar. 2004.

"Agricultural Technologies Could Increase Global Crop Yields as Much as 67 Percent and Cut Food Prices Nearly in Half by 2050", Published on: Feb. 12, 2014 Available at: https://www.ifpri.org/news-release/agricultural-technologies-could-increase-global-crop-yields-much-67-percent-and-cut.

Langendoen, et al., "Murphy loves potatoes: experience from a pilot sensor network deployment in precision agriculture", In Proceedings of 20th IEEE International Parallel & Distributed Processing Symposium, Apr. 25, 2006, 8 pages.

Schmidt, James, "Weak Internet connectivity in rural areas hindering agricultural production", Published on: Apr. 4, 2016 Available at: https://www.ksre.k-state.edu/news/news-stories/2016-news-releases/april/internet-connectivity040416.html.

Kim, et al., "Soil micronutrient sensing for precision agriculture", In Journal of Environmental Monitoring, Issue 11, Aug. 13, 2008, pp. 1810-1824.

"Kolor", Retrieved on: Jun. 17, 2016 Available at: http://www.kolor.com/.

Kumar, et al., "Aerial video surveillance and exploitation", In Proceedings of the IEEE, vol. 89, Issue 10, Oct. 2001, pp. 1518-1539.

Kwatra, et al., "Graphcut textures: image and video synthesis using graph cuts", In Journal ACM Transactions on Graphics, vol. 22, Issue 3, Jul. 2003, pp. 277-286.

Lee, et al., "A modular 1mm3 die-stacked sensing platform with optical communication and multi-modal energy harvesting", In Proceedings of IEEE International Solid-State Circuits Conference, Feb. 22, 2012, pp. 402-404.

Levis, Philip, "Experiences from a decade of tinyos development", In Proceedings of 10th USENIX Symposium on Operating Systems Design and Implementation, Oct. 8, 2012, pp. 207-220.

Li, et al., "Large scale image mosaic construction for agricultural applications", In Journal of IEEE Robotics and Automation Letters, vol. 1, Issue 1, Jan. 2016, pp. 295-302.

"LoRa Technology", Retrieved on: Jun. 21, 2016 Available at: https://www.lora-alliance.org/What-Is-LoRa/Technology.

Mainwaring, et al., "Wireless Sensor Networks for Habitat Monitoring", In Proceedings of the 1st ACM international workshop on Wireless sensor networks and applications, Sep. 28, 2002, pp. 88-97.

McBratney, et al., "Estimating Average and Proportional Variograms of Soil Properties and Their Potential Use in Precision Agriculture", In Journal of Precision Agriculture, vol. 1, Issue 2, Sep. 1999.

McBratney, et al., "Future Directions of Precision Agriculture", In Journal of Precision Agriculture, vol. 6, Issue 1, Feb. 2005, pp. 7-23.

"Microsoft Research-Image composite editor", Retrieved on: Jun. 21, 2016 Available at: http://research.microsoft.com/en-us/um/redmond/projects/ice/.

(56) References Cited

OTHER PUBLICATIONS

Mueller, et al., "Closing Yield Gaps through Nutrient and Water Management", In Journal of Nature, vol. 490, Oct. 11, 2012, pp. 254-257.

Ortiz, et al., "Management Zones II—Basic Steps for Delineation", Published on: Mar. 2011 Available at: https://sites.aces.edu/group/crops/precisionag/Publications/Timely%20Information/Management%20Zones%20II%20-%20Basic%20Steps%20for%20Delineation.pdf.

"PIX4D", Retrieved on: Jun. 21, 2016 Available at: https://pix4d.com/.

Pols, Mary, "To run their businesses, farmers need reliable internet connections", Published on: Feb. 8, 2015 Available at: http://www.pressherald.com/2015/02/08/to-run-their-businesses-farmers-need-reliable-internet-connections/.

"Precision Planting—Ag Insights", Retrieved on: Jun. 21, 2016 Available at: http://www.precisionplanting.com/#ag_insights/.

"Invitation to Pay Additional Fees Issued in PCT Application No. PCT/US2017/048105", dated Mar. 15, 2018, 14 Pages.

"International Search Report & Written Opinion Issued in PCT Application No. PCT/US2017/048105", dated May 8, 2018, 19 Pages.

\* cited by examiner

GENERATING REAL-TIME SENSOR MAPS FROM VIDEOS AND IN-GROUND SENSOR DATA

BACKGROUND

Current applications of technology for area mapping and area analysis use detailed sensor maps of an area to generate and display data. The data may be generated in the form of a precision map that shows, for example, parameters measured by sensors at specific locations. Applications may include, for example, applications used in agriculture, forestry, mining, climate monitoring, or security. The measured parameters may include parameters such as soil moisture, ground temperature, soil acidity level, ground movement, or other parameters. The current applications rely on a deployment of sensors within an area to provide the detailed sensor map. The deployment of sensors must normally be extremely dense in order to provide accurate data about the area. Other current area mapping and analysis applications may rely on the use of videos taken from aerial vehicles (AVs) such as drones (i.e., unmanned aerial vehicles (UAVs). However, a video taken from an AV cannot provide actual ground data. For example, in agricultural applications videos taken from AVs do not have detailed information about actual soil health, such as moisture content, temperature, or acidity level. In these applications that use an AV, a dense deployment of sensors would also be needed to provide actual accurate ground data about the area. Additionally, a typical high definition AV video made during a 15 minute flight can commonly exceed a gigabyte (GB) in size and may be difficult to manage and/or transfer.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments of the disclosure include apparatus and methods for efficiently and accurately generating precision maps of an area. The methods and apparatus allow creation of a precision map from video data, for example a video of an aerial overfly of the area, and from sensor data. The sensor data may be generated by sensors that are sparsely deployed throughout the area. The embodiments include apparatus and methods for generating an efficient and accurate orthomosaic of an area from the video data. The embodiments further included apparatus and methods for combining the orthomosaic with the sensor data measured at the sparsely deployed sensors to generate the precision maps.

In an implementation, an apparatus may be configured to receive sensor data where the sensor data includes sensor readings, each indicating a level of a parameter in one of a plurality of first portions of an area. The apparatus may also be configured to receive video data representing an aerial view of the area. The sensor data may be received, for example, from sensors that are each deployed in one of the first portions of the area. The video data may be received, for example, from an aerial vehicle (AV) such as a drone (i.e., unmanned aerial vehicle (UAV)) that performs flyovers of the area. The apparatus may generate an orthomosaic from the video data and then generate a predication model using the orthomosaic and the sensor data. The prediction model may then be used to extrapolate the sensor data to determine a level of the parameter in each of second portions of the area. The second portions of the area may be portions of the area that do not contain sensors. The apparatus then may generate a map of the area. The map may include data that is displayable to provide an aerial view of the area and data that indicates the level of the parameter in each of the first and second portions of the area. In various example implementations, the level of the parameter may include a heat, moisture, or acidity measurement. The data on the levels of the parameter each of the first and second portions of the area may be displayable to provide a heat, moisture, or acidity map of the area. In an implementation in which the apparatus receives new sensor data more frequently than the apparatus receives new video data, the apparatus may update the map based on the new sensor data and a previously generated orthomosaic and/or prediction model. When new video data is received, the apparatus may update the previously generated orthomosaic and prediction model.

In another implementation an apparatus may be configured receive video data representing an aerial overview of an area. The video data may be received, for example, from a AV that performs flyovers of the area. The apparatus may then determine images from the video data, align the images, and stitch the aligned images together. The apparatus may generate an orthomosaic from the stitched images, where the orthomosaic includes data that is displayable to provide a geographically referenced image of the area. The apparatus may align the images to generate the orthomosaic by sampling frames from the video data, generating 3D position data and 3D orientation data corresponding to each of the frames, and generating 3D point data corresponding to a scene of the area. The apparatus may stitch the images to generate the orthomosaic by warping each of the frames to a ground plane to create warped images, determine optimal seams in areas where the warped images overlap, and adjust colors of each of the frames using the optimal seams.

In a further implementation an apparatus may be configured to receive sensor data, where the sensor data includes sensor readings each indicating a level of a parameter in a portion of first portions of an area. The apparatus may generate a prediction model using the sensor data and an orthomosaic of the area to generate a prediction model. The prediction model may then be used to extrapolate the sensor data to determine a level of the parameter in each portion of second portions of the area. The apparatus may then use the extrapolated sensor data to generate a map of the area, where the map includes data that is displayable to indicate the level of the parameter in each of the first and second portions of the area. The prediction model may be generated by determining visual similarities of the first and second portions and determining spatial similarities of the first and second portions. The prediction model for a level of the parameter in each of the second portions may then be generated from the visual and spatial similarities of the first and second portions of the area.

DETAILED DESCRIPTION

The system and method will now be described by use of example embodiments. The example embodiments are presented in this disclosure for illustrative purposes, and not intended to be restrictive or limiting on the scope of the disclosure or the claims presented herein.

Current area mapping and analysis applications require use of a detailed sensor map of an area for generating and displaying data. The data is commonly generated in the form of a precision map that shows, for example, parameters measured by sensors at specific locations. These applications may include, for example, applications used in agriculture, forestry, mining, climate monitoring, or security. The measured parameters may include parameters such as soil moisture, ground temperature, soil acidity level, ground movement, or any other appropriate parameter. Current applications rely on a deployment of sensors within an area to provide a detailed sensor map. The deployment of sensors must normally be extremely dense in order to provide accurate data about the area. This dense deployment of sensors requires a large number of sensors which is expensive. For example, accurate sensors for agricultural applications are expensive. The deployment of even one sensor per acre quickly becomes cost-prohibitive for most farmers.

Other current area mapping and analysis applications may rely on the use of videos taken from aerial vehicles (AVs) such as drones (i.e., unmanned aerial vehicles (UAVs)) or helicopters performing a flyover of an area to provide video data for a detailed map. However, a video taken from an AV cannot provide actual ground data. For example, in agricultural applications videos taken from AVs do not have detailed information about actual soil health, such as moisture content, temperature, or acidity level. In these applications that use an AV, a dense deployment of sensors would be needed to provide actual accurate ground data about the area.

The embodiments of the disclosure provide technical advantages by allowing use of a sparse deployment of sensors that requires fewer sensors and incurs less expense then currently used methods of creating sensor maps. Implementations of the embodiments include systems, apparatus and methods that compress video data captured from an AV into an aerial orthomosaic overview of an area. The orthomosaic may then be processed in combination with sensor values, measured by sensors sparsely deployed in the area, to generate precision maps for the entire area, including areas in which no sensors are deployed. For example, sensors that directly measure soil temperature at locations in the area can inform a machine learning pipeline to make predictions or extrapolations about other locations in the area by considering spatial proximity of the other locations to the deployed sensors. Visual similarity of the areas of the other locations as compared to areas within which the sensors are deployed can also inform the machine learning pipeline to make predictions about the other locations.

The embodiments also provide an advantage through the conversion and compression of the video data into the orthomosaic which results in a robust orthomosaic with few visual artifacts. The robust orthomosaic then allows resource efficient extrapolation of sensor data and generation of precision maps. In implementations of the embodiments, selected elements of aerial 3D mapping techniques are combined with selected elements of image stitching techniques. The new techniques that use the combination of the selected elements are also more robust than currently used techniques that use either aerial 3D mapping or aerial image stitching alone. In addition, the implementations are faster than currently used aerial 3D mapping techniques. This is because the implementations avoid several computationally expensive processing steps used in the current 3D mapping techniques. For example, the embodiments of the disclosure do not require construct of a dense digital surface model (DSM) of the terrain from an aerial video. This avoids the need for the high resolution depth maps used to create accurate DSMs in current 3D mapping techniques. The creation of DSMs is both computationally and memory intensive, and may not be suitable for resource constrained systems.

The compression of video data into an orthomosaic according to the embodiments also provides advantages in that the orthomosaic may include much less data than the original video data. For example, the orthomosaic may be an order of magnitude smaller than the video at full resolution. This provides advantage when the video data is being processed in a device in a weakly connected internet setting, i.e., when a connection to the internet is only available to the device over an intermittent or over a slow/low bandwidth connection. For example, sending large data files such as videos over an Internet connection takes time, and may also cost more than sending conventionally sized data files. These problems may be especially acute for internet of things (IoT) applications that use high volume data collecting devices such as AVs that collect video data. A typical high definition AV video made during a 15 minute flight can commonly exceed a gigabyte (GB) in size. Sending an entire video of this size over a weak internet connection for processing in a cloud network may take a long time. In the weakly connected setting, a user may find the time it takes to send such a large video file unacceptable because of the slow connection speed, or because the connection is only available intermittently. Services that utilize the video may then be degraded as far as service latency and quality of service. Other service relying on the same weak internet connection may also be degraded when the large video file is sent. In the embodiments, only the orthomosaic and sensor data need be sent to a cloud network rather than the whole video. The cloud network may then reconstruct the precision maps using based on the orthomosaic and sensor data.

The embodiments may be utilized to construct a dynamic, precision map that captures and presents the temporal variations of various environmental parameters on an area. The precision map may be constructed by generating an orthomosaic from a flyover video taken from an AV and then processing the orthomosaic in combination with sensor data to generate the precision map. The flyover videos may be generated at first time intervals. The sensor data may be received at second time intervals shorter than the first time intervals so the sensor data is received at a higher frequency than the video data. Each time new video data is received the orthomosaic used for generating the precision map may be updated. Each time the sensor data is received the precision map may be updated based on the current orthomosaic. This provides an advantage when the sensor data changes more quickly than the video data. Video data may be days or weeks old but the precision map may be kept up to date with current sensor data.

Figure 1A:
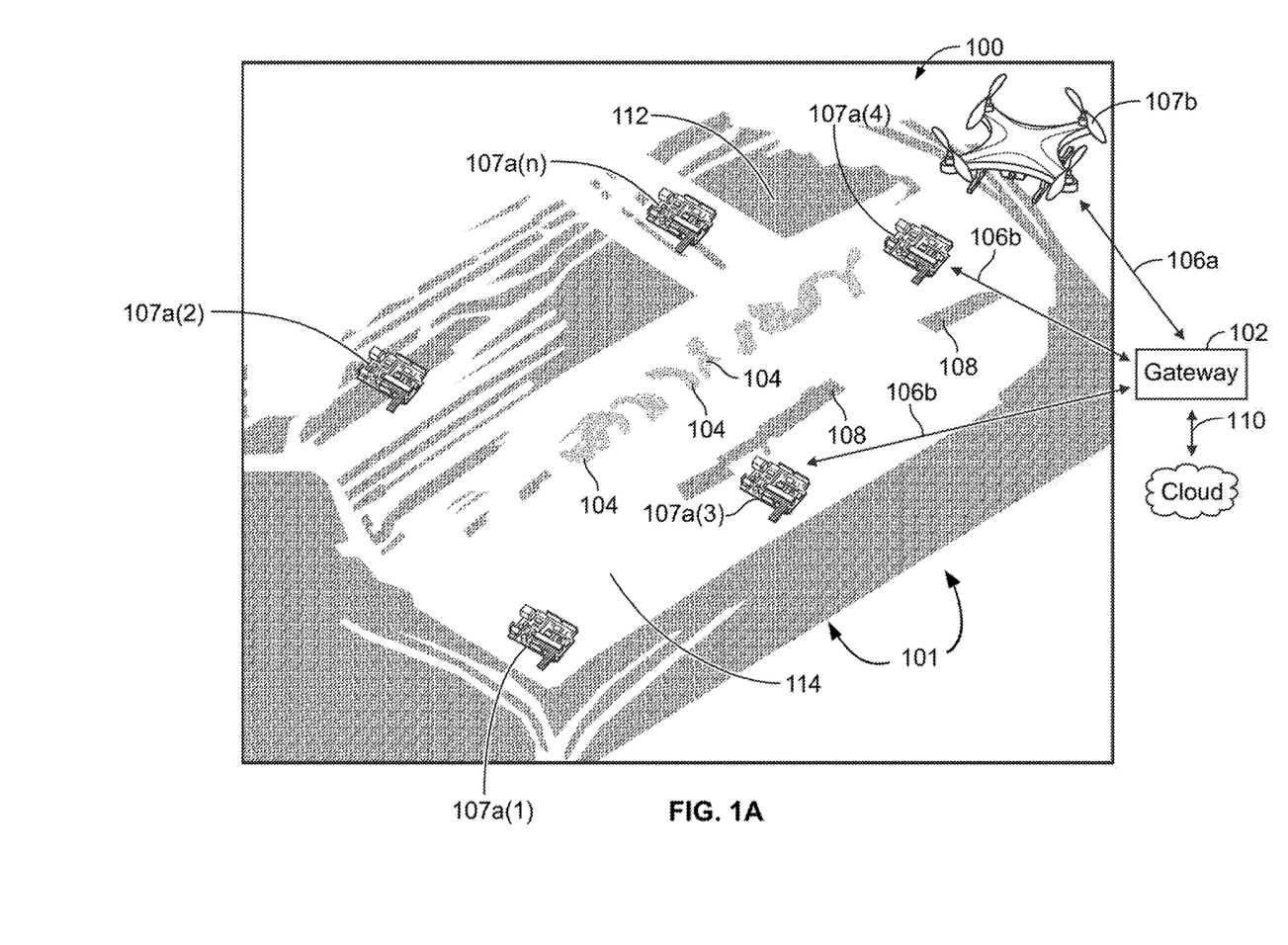
FIG. 1A is an illustration of an example system implemented in an area.

An example scenario in which the embodiments provide an advantage may include an agricultural setting in a remote area. To avoid shipping gigabytes of drone video and sensor data to the cloud over a weak internet connection in the agricultural setting, video processing may be performed locally on a low-cost PC, or a similar apparatus/machine functioning as a gateway. The gateway may be located at a farmer's home or office and collect information from ground sensors sparsely deployed in an area of the farm. The farmer may also use an AV to perform overflies of the area to create videos which are sent to the gateway. The gateway may compress the video and sensor data into summarized precision maps of the farm. To do so, the gateway first converts the drone video into a detailed orthomosaic of the farm and extrapolates the sensor readings to generate a precision map of the farm using embodiments of the disclosure. In one implementation, the gateway may send the orthomosaic and sensor data to the cloud. This reduces the size of data shipped to the cloud by an order of magnitude. In another implementation the gateway may only sends the precision maps to the cloud. This further reduces the size of data shipped to the cloud by another order of magnitude. In this way, the gateway may enable long term as well as cross-farm analytics in cloud services, while still continuing to provide near real-time analytics locally to the farmer through a web-based interface in the gateway FIG. 1A is an illustration of an example system implemented in an area for agricultural application. In FIG. 1A, system 100 is shown as implemented in an example area 101 which may be an area of a farm for growing crops or maintaining livestock. System 100 includes gateway 102. Gateways 102 may be configured to communicate with a cloud network over link 110. Link 110 may comprise, for example, a hypertext transfer protocol (HTTP) or advance messaging queuing protocol (AMQP) connection implemented over a local internet/cloud interface such as a Wi-Fi connection. Gateway 102 may receive data from devices such as one or more sensors 107a(1)-107(n), over wireless interfaces 106b implemented using television white space (TVWS) spectrum, Wi-Fi spectrum, or any other suitable wireless spectrum. Use of TVWS spectrum, which is in the lower frequencies, allows signals to propagate much farther than signals in 2.4 GHz or 900 MHz of the spectrum. TVWS signals may also propagate through the leaves and crop canopies of a remote environment. Sensors 107a(1)-107(n) may include sensors to measure soil temperature, soil moisture at different depths, soil acidity (pH), and normalized vegetation index (NDVI) using on-field IR sensors/cameras. The one or more sensors 107a(1)-107(n) are not shown to actual size, and would normally be smaller in relation to the dimensions of the area 101. The sensors 107a(1)-107(n) may communicate the data to gateway 102 using protocols such as MQ telemetry transport (MQTT) or transport control protocol (TCP), depending on the configurations of the particular sensors 107a(1)-107(n) that are used. FIG. 1A also shows unmanned aerial vehicle (UAV) 107b. UAV 107b may be any type of UAV that includes a video camera. For example UAV 107b may be a quadcopter UAV that includes a high resolution video camera. UAV 107b may be controlled by an auto-pilot application. Video data may be received by gateway 102 from UAV 107b over link 106a using, for example, file transfer protocol (FTP). In the example of FIG. 1A, the gateway 102 and sensors 107a(1)-107(n) and/or UAV 107b may comprise a local network. In other implementations a piloted aerial vehicle may be used in place of UAV 107b.

Area 101 is shown as including various differentiated areas. Area 104 may represents an area darker in color and wetter than surrounding areas. Area 112 may represents an area of particular plants/vegetation. Area 108 may represents another area of other plants/vegetation. Area 114 may represent a dirt area without plants or vegetation.

In an implementation of system 100, gateway 102 may comprise a gateway that is located in a weakly connected setting, i.e., in a setting in which connections over the local internet/cloud interface for link 110 is only available intermittently, and/or is only available with poor quality or low speed/low bandwidth connections. Gateway 102 may provide local services though user interfaces and/or connected devices for users located in the service area of gateway 102. The services may include local services that do not require communication with cloud network 116. The services may also include local services that require communication with cloud network 116. Use of data from gateway 102 may also enable provision of cloud services to users located remotely from gateway 102. Data that is communicated to the cloud network 116 from gateway 102 may also be combined with other data, such as weather data or data from gateways operating in other agricultural areas, in the cloud network 116 in order to provide enhanced cloud based services on a more global scale.

System 100 has application in any situation where an area may be monitored/analyzed using video data and/or sensor data. For example, system 100 may have application for use in providing services to other operations such as mining, mapping, geographical research, oceanography, environmental research, forestry, security, or surveillance over any type of area.

Figure 1B:
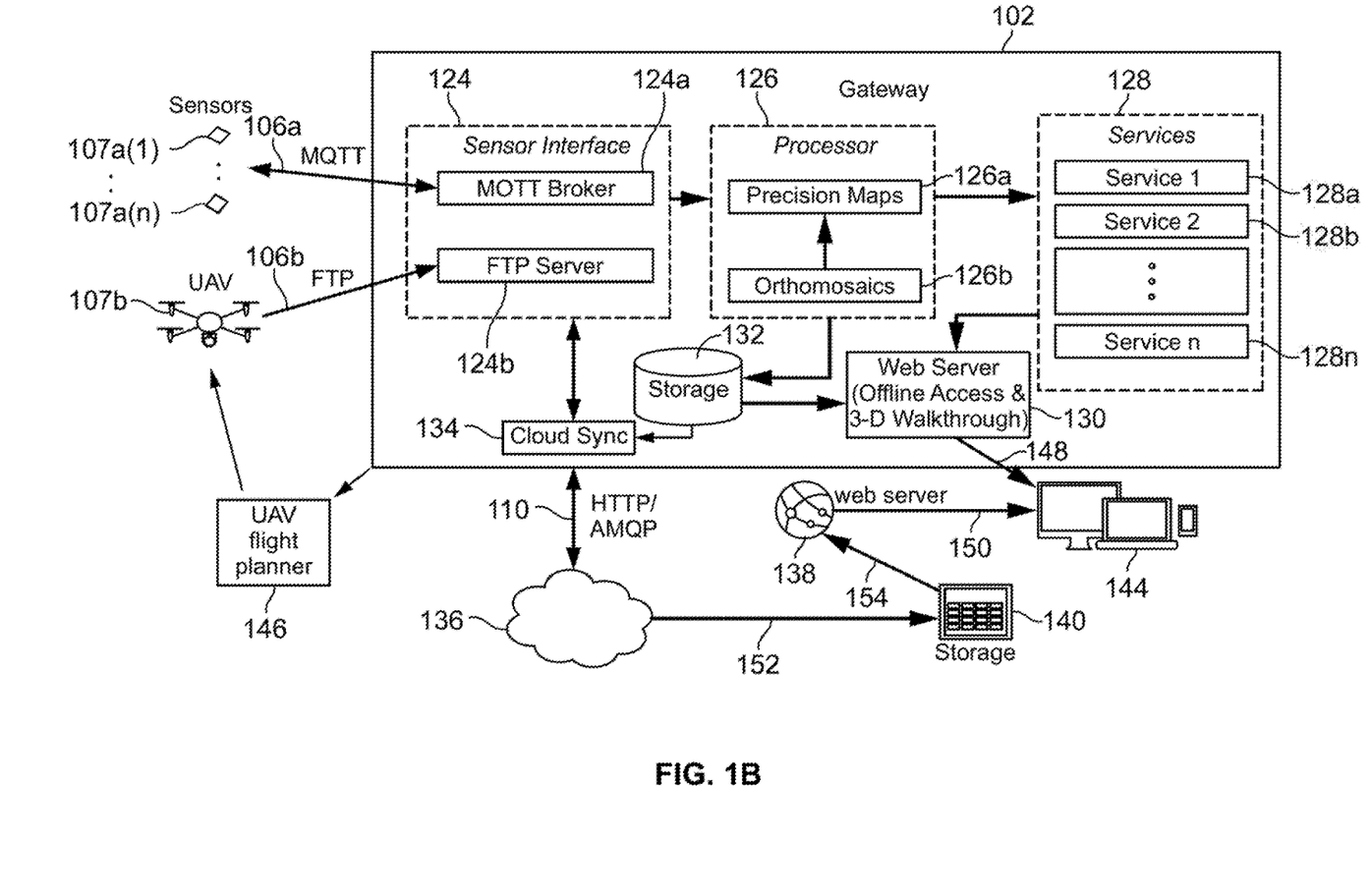
FIG. 1B is a simplified diagram illustrating portions of an example gateway.

FIG. 1B is a simplified diagram illustrating portions of an example gateway. Gateway 102 of FIG. 1B illustrates an example implementation of gateway 102 of FIG. 1A. Gateway 102 may include sensor interface 124, processor 126, service functions 128, web server 130, storage 132, and cloud sync 134. Processor 126 includes precision maps function 126a and orthomosaic function 126b. Sensor interface 124 includes MQTT broker 124a for receiving sensor data from environmental sensors 107a(1)-107(n) over a MQTT link 106a. Sensor interface 124 also includes FTP server 124b for receiving video data from one or more video cameras on UAV 107b over FTP link 106b. Orthomosaic function 126b generates orthomosaics from video data. Precision maps function 126a generate precision maps from the orthomosaics and the sensor data.

Gateway 102 may also be connected to a UAV flight planner 146 implemented in a computing device. For example, UAV flight planner 146 may be implemented as an application in a smartphone, tablet computer, laptop computer or desktop computer connected to gateway 102 by a Wi-Fi or other type of connection. UAV flight planner 146 may communicate with, and control, UAV 107b over a radio control link configured in the device in which the UAV flight planner 146 is implemented. UAV flight planner 146 may also communicate with, and control, UAV 107b through gateway 102, for example over FTP link 106b. In an alternative implementation, UAV flight planner 146 may be implemented as part of gateway 102. Webserver 130 of gateway 102 may also be connected to one or more devices 144 through, for example, a Wi-Fi link 148 to allow gateway 102 to provide local network services to a user of devices 144 without requiring a cloud connection (i.e., while offline). Gateway 102 also may be connected to the cloud network 116 though HTTP/AMQP link 110. The Cloud network 116 may provide cloud services based on the data received from gateway 102 and/or received from other gateways. Devices 144 may also provide users access to a remote webserver 138 to allow users to access services provided by the cloud network 116 when internet/cloud connections are available. The link 150 from devices 144 to webserver 138 may be implemented over the same weakly connected local Wi-Fi internet/cloud interface as is HTTP/AMQP link 110. Cloud network 116 may also include a connection to a global storage 140 that stores data for use by cloud services.

In an example implementation, gateway 102 may be implemented in an agricultural setting including an area such as area 101 of FIG. 1A. In the agricultural setting, gateway 102 may be implemented as a gateway connecting a local network to the internet/cloud 116. The local network may comprise sensors 107a(1)-107(n) and UAV 107b from which gateway 102 receives data. In one example implementation, the local network may provide agricultural services to the owner of a farm within which the local network including gateway 102 is configured.

The local network may be configured for efficient provision of services despite a lack of inexpensive internet/cloud connectivity in the fields, and despite a slow and unreliable network connection to cloud network 116 from elsewhere in the local network, for example, from the farmer's house or office. Services may be provided using a task allocation and data transfer scheme between gateway 102 and cloud network 116 that allows for efficient provision of both local services 125, and cloud services 120 and 122 in the weakly connected setting.

Various sets of data generated during the process of creating precision maps, such as the orthomosaic and sensor data, may also be backed up in storage 132 for sending to the cloud network 116 to enable cross-farm (i.e., between different farms) and long-term analytics performed in the cloud network 116. The various sets of data may be queued for sending to the one or more cloud network base on assigned priorities that allow for efficient provision of both local and cloud services given the weakly connected setting. The task allocations and the various sets of data may be configured to avoid sending large data sets on the weakly connected setting.

Figure 2A:
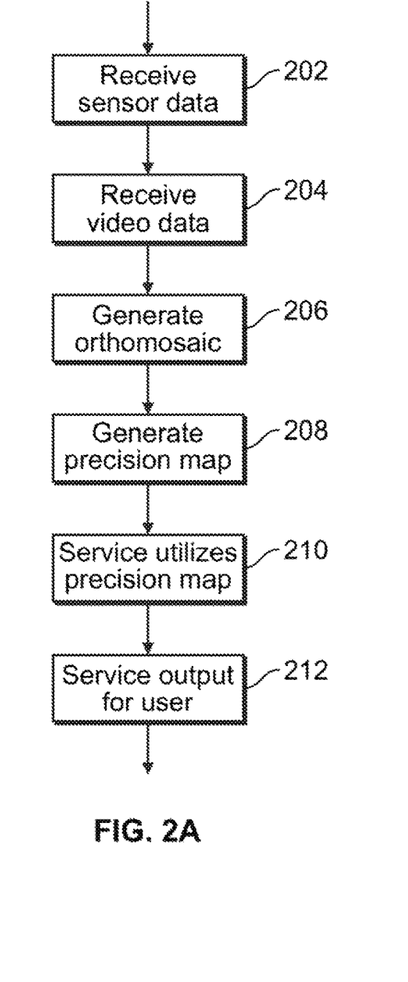
FIG. 2A is a flow diagram illustrating operations performed in the gateway of FIG. 1B.

FIG. 2A is a flow diagram illustrating operations performed in an example gateway. FIG. 2 may be explained with reference to gateway 102 of FIGS. 1A and 1B. At 202, sensor interface 124 of gateway 102 receives sensor data from each of sensors 107(a)-107(n). The sensor data may be generated from sensor readings performed by each of sensors 107a(1)-107(n) to measure a parameter in a portion or block of area 101 in which each sensor of sensors 107a(1)-107(n) is located. For example, sensor 107a(1) may generate sensor readings for a portion of area 101 in which sensor 107a(1) is located, and sensor 107a(2) may generate sensor readings for a similar sized portion of area 101 in which sensor 107a(2) is located. Area 101 may be divided into a plurality of similar sized portions, some of which contain deployed sensors and other portions that do not contain any sensor. The size of the portions may depend, for example, on the particular types of parameters being measured, the number of actual sensors that are deployed, and/or on a desired granularity/accuracy of a precision map to be generated.

At 204, sensor interface 124 of gateway 102 receives video data from UAV 107b. The video data is provided to orthomosaic function 126b of processor 126 to generate an orthomosaic. The video data, which may comprise several gigabytes of data, is converted by orthomosaic function 126b into an orthomosaic that comprises a compact representation of an aerial view RGB color image of the area 101. In one example implementation, the orthomosaic may be constructed from the UAV video using a hybrid technique which combines components from both 3D mapping and mosaicking to construct the orthomosaic. For example, techniques from aerial 3D mapping may be used to estimate the relative position of different video frames without computing expensive high resolution digital surface maps. This allows the inaccuracies due to non-planar nature of area 101 to be removed. Once the relative positions have been computed, the images may be stitched together using mosaicking techniques to generate the orthomosaic.

At 208, precision map function 126a of processor 126 generates a precision map. The orthomosaic is provided to the precision map function 126a. Precision map function 126a uses the sensor data, received at 202, along with visual features in the orthomosaic, to determine a prediction model/function for extrapolating the sensor readings to create a precision map or update an existing precision map. For example, sensor data received from sensors 107a(1)-107a(n) that measures soil temperature at the locations of sensors 107a(1)-107(n) allow precision map function 126a to make predictions about every location in the farm. This may be done by considering spatial proximity as well visual similarity of the locations to the sensors 107a(1)-107(n). Visual similarity may be determined by analyzing spatial and visual smoothness. Areas that have similar spatial and visual smoothness may be considered to have similar sensor readings.

Precision map function 126a uses the prediction model and the latest sensor data to generate one or more precision maps of area 101. Precision map function 126a may use the prediction model to extrapolate the received sensor data to determine a predicted level of the measured parameter in each of the plurality of portions of the area that do not contain one of sensors 107a(1)-107a(n) and generate a precision map. The precision map may comprise a moisture map, pH map, temperature map, or a map of other parameters. The precision map may include data that is displayable to indicate the level of the parameter in each of the portions of area 101 that include sensors 107a(1)-107a(n) and, also, may indicate a level of the parameter in each of portions of the area 101 that contain no sensors.

At 210 services 128 of gateway 102 may utilize the precision map. For example, the map may be displayed to a user of gateway 102 to allow the user to observe moisture levels, pH level, temperature levels, or other parameters in the area 101. Service 128 may also include applications that may provide, at 212, management instructions or plans, such as irrigation or fertilizing programs, based on the precision map.

Figure 2B:
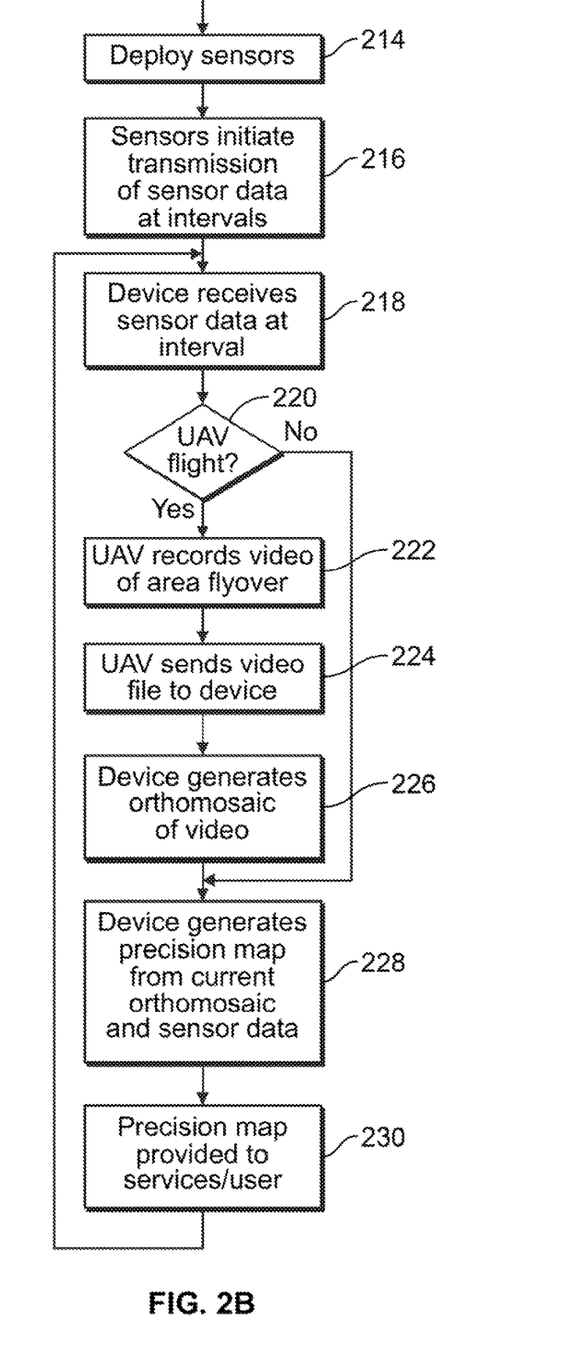
FIG. 2B is a flow diagram illustrating further operations performed in the gateway of FIG. 1B.

FIG. 2B is a flow diagram illustrating further operations performed in an implementation of the process of FIG. 2A. The process begins at 214 where sensors 107a(1)-107a(n) are deployed to monitor the environment of portions of area 101. Sensors 107a(1)-107a(n) may be used to monitor soil temperature, moisture, soil pH, etc., in the proximity of each of the sensors 107a(1)-107a(n) and generate sensor data. At 216, sensors 107a(1)-107a(n) initiate transmission of sensor data to gateway 102 at intervals. The sensor data may be sent to gateway 102 at predetermined times, for example every 10 minutes, or at any other periodic or irregular time schedule as appropriate to collect relevant data.

At 218, gateway 102 begins to receive the sensor data from sensors 107a(1)-07a(n) at sensor interface 124 over MQTT interface 106a at the intervals at which the sensor data is sent. Gateway 102 may continue to receive the sensor data at each interval throughout the process of FIG. 2B. Sensor interface 124 may provide the sensor data to processor 126 for processing. Processor 126 may also queue the received sensor data in storage 132 for sending to cloud network 116 by cloud sync 134. The sensor data may be assigned a time sensitive priority for sending. In a weakly connected setting, this causes the sensor data to be sent to cloud network 116 with a preferred priority when the connection is intermittent or of low quality/low speed bandwidth. In the implementation of FIG. 2B, each time new sensor data is received at 218 the process may move to 220.

At 220, gateway 102 determines if it is time to send UAV 107b on a flight to collect video data over the area 101 in which sensors 107a(1)-107a(n) are located. The flights of UAV 107b may be timed to occur at intervals that are longer than the intervals at which sensor data is received at 218. If it is determined that it is not time for a UAV flight, the process moves to 228. If, however, it is determined at 220 that it is time for a UAV flight, gateway 102 sends a notification to UAV flight planner 146 and UAV 107a is flown over the area in which sensors 107a(1)-107a(n) are located to record a video of an aerial view of the area 101. In an implementation, the UAV flights may be initiated by gateway 102, or another device communicating with gateway 102 in the local network, on a predetermined basis, for example once or twice every 24 hours or several times a week. In another implementation, the UAV flights may be initiated by receipt of user input at a device in which UAV flight planner 146 is installed, such as, for example, computer device 144 when a user desires to collect video data. The flight of UAV 107a may be directed by a user of UAV flight planner 146 or may be an automatically controlled flight. At 224, UAV 107b sends video data of the flyover to gateway 102. Gateway 102 receives the video data over FTP interface 106b at FTP server. The video data is then input from sensor interface 124 to orthomosaic converter 126b of processor 126.

At 226, the video data, which may comprise several gigabytes of data, is converted by orthomosaic function 126b into an orthomosaic that comprises a compact representation of an aerial view RGB color image of the area in which the sensors 107a are located. In one example implementation, the orthomosaic may be generated from the UAV video using the hybrid technique as described for operation 206 of FIG. 2A. Processor 126 also queues the orthomosaic in storage 132 for sending to cloud network 116 by cloud sync function 134 when a cloud connection for sending the orthomosaic is available. In an implementation, the orthomosaic may be assigned non-time sensitive priority. The non-time sensitive priority causes cloud sync function 134 to send the orthomosaic on a low priority basis when a cloud connection is available. In a weakly connected setting, this causes the orthomosaic to be sent to the cloud network 116 with a low priority when the connection is intermittent or of low quality/low speed bandwidth. Cloud network 116 may then use the orthomosaic to generate an updated precision map for online services 120 and 122.

At 228, gateway 102 generates a precision map from the mosaic and/or current sensor data. If operation 228 is entered from operation 226, the mosaic generated at operation 226 is used along with the current sensor data. In this case, the orthomosaic and current sensor data are input to the precision map function 126a in processor 126 of gateway 102. Precision map function 126a uses the current sensor data along with visual features in the current orthomosaic, to determine a prediction model/function for extrapolating the sensor readings to generate a precision map or generate an updated precision map. In one example implementation, the precision map may be generated as described for operation 208 of FIG. 2A. If operation 228 is entered from operation 220, the current sensor data (latest sensor data received) is used to update the precision map. In this case, precision map function 126a uses an existing prediction model/function created from a previous orthomosaic for extrapolating the sensor readings to update a precision map.

At 228, Processor 126 may also queue any updated data/information associated with the function for extrapolating the sensor readings in storage 132 for sending to cloud network 116. In an implementation, the data/information associated with the function for extrapolating the sensor readings sensor may be assigned a time sensitive priority for sending to the cloud network 116. In a weakly connected setting, this causes the data/information for extrapolating the sensor readings to be sent to cloud network 116 with a preferred priority when the connection is intermittent or of low quality/low speed bandwidth. Cloud network 116 may then use the data/information associated with the function for extrapolating the sensor readings for time critical analysis by updating mosaics and sensor data currently being used in cloud network 116 for providing services. For example, if sensors 107a(1)-107a(n) monitor conditions that change quickly, such as moisture or temperature, updated data/information associated with the function for extrapolating the sensor readings will allow cloud network 116 to use current data/information associated with the function for extrapolating the sensor readings for analysis and provide up to date analysis. The data/information associated with the function for extrapolating the sensor readings may be assigned the preferred priority based on that data requiring less bandwidth and be easier to transmit without error or interfering with other data transmission in the weakly connected setting.

In the process of FIG. 2B, each time gateway 102 receives new video data at 224, precision map function 126a makes adjustments to the prediction model/function for extrapolating the sensor readings using the new video data. Precision map function 126a then uses the orthomosaic RGB color image together with the current sensor data to generate/update one or more precision maps of area 101. Also, upon receiving updated sensor data at intervals when no new video data is available, precision map function 126a may use the sensor data and existing prediction model/function to update the precision map. This would happen when the process moves from operation 218 to 228 by bypassing operations 222 to 226. This allows the precision map to be kept current with the received sensor data, even though video data is not received by gateway 102 as often as sensor data. Video data may be days or weeks old but the precision map may be kept up to date with current sensor data. This is useful when the sensor data changes more rapidly than the video data.

At 230, processor 126 provides the precision map to services 128. The precision maps may then be accessed and utilized by service function 128 to provide services at gateway 102. Service function 128 may include services, such as service-1 128a through service-n 128n, each of which may be a service that utilizes a precision map. For example, a precision map may be used to provide services by generating information to a user about what tasks need to be performed, and where the tasks need to be performed on the farm. In an example implementation, an irrigation service may utilize a moisture map to provide information about the amount of water to use for irrigation on different parts of a farm. In another example, a precision pH service may utilize a pH map to provide information or recommendations about how much lime to apply on different parts of a farm to reduce the acidity of the soil in those regions. Processor 126 may also store the one or more precision maps in storage 132.

Use of cloud Sync component 134 ensures that the relevant data is backed up in the cloud for data access outside the agricultural network (e.g. when the farmer is travelling), for long term studies, and for cross-farm analytics. Because the video data received from the UAV is large in size, and the internet/cloud connection is weak, the UAV video data is not sent to the cloud. The video data may be kept in local storage 132 for a predefined duration, after which the video data may be deleted. In other implementations, additional levels of priority may be used for queuing data for sending from gateway 102 to cloud network 116. For example, a level of intermediate time sensitive, which has may have a priority between time sensitive and non-time sensitive, may be assigned.

Figure 3A:
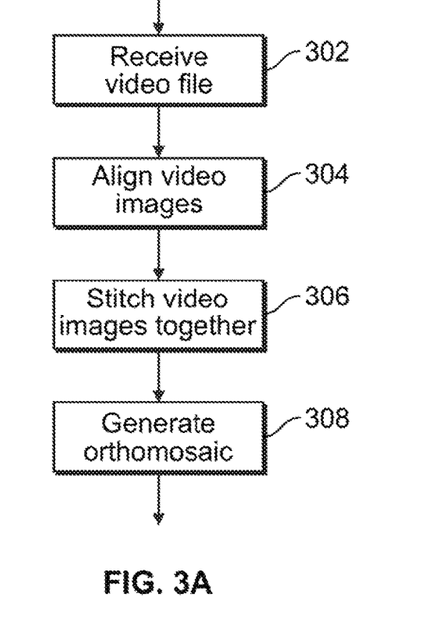
FIG. 3A is a flow diagram illustrating example operations for generating an orthomosaic.

FIG. 3A is a flow diagram illustrating example operations for generating an orthomosaic. The example operations of FIG. 3A may be used, for example, in performing operation 206 of FIG. 2A. At 302, sensor interface 124 of gateway 102 receives the video data representing an aerial overview of the area from UAV 706b. The video is provided to orthomosaic function 126b of processor 126. At 304 orthomosaic function 126b determines a plurality of images from the video data and aligns each of a plurality of images. At 306 orthomosaic function 126b stitches the plurality of aligned images together. Then at 308, orthomosaic function 126b generates an orthomosaic from the stitched plurality of images.

Figure 3B:
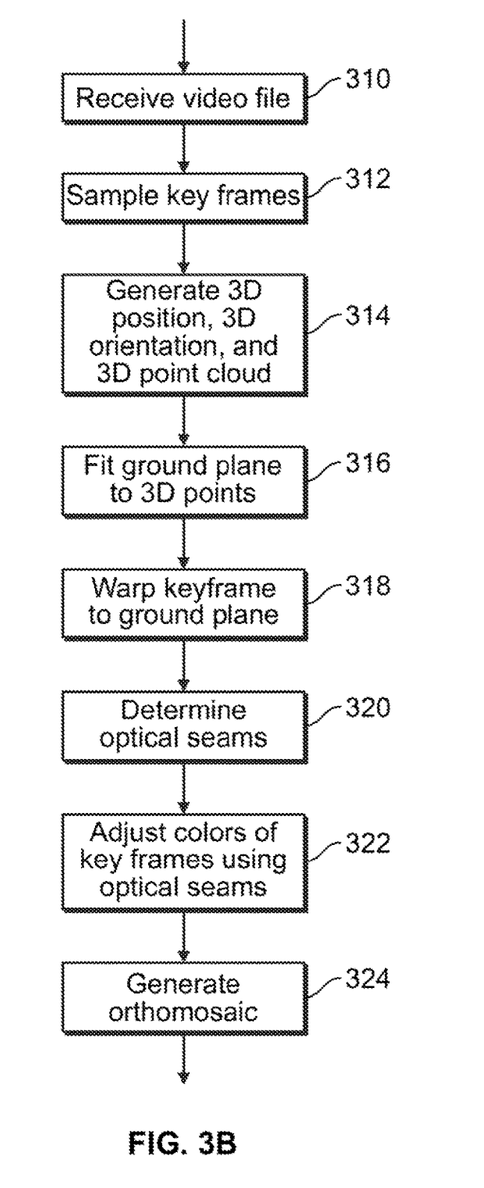
FIG. 3B is a flow diagram illustrating further example operations for generating an orthomosaic.

FIG. 3B is a flow diagram illustrating further example operations that may be used in the process of FIG. 3A for generating an orthomosaic. At 310, sensor interface 124 of gateway 102 receives the video data representing an aerial overview of the area from UAV 706b. The video is provided to orthomosaic function 126b of processor 126. At 312 orthomosaic function 126b samples the video data to determine key frames. Next, at 314, orthomosaic function 126b performs structure from motion conversion (SfM) on the key frames sampled from the input video. This generates precise 6 degree of freedom (6-dof) camera pose (i.e., 3D position and 3D orientation) estimates corresponding to the key frames along with a sparse 3D reconstruction of the scene (a 3D point cloud). Next, at 316, orthomosaic function 126b fits a ground plane to the 3D points generated in 314 using total least squares regression. In the implementation of FIG. 3B, a single global plane is fit to all the 3D points. In other implementations, the plane fitting step may use multiple planes in an adaptive fashion to deal with uneven terrain.

Next, at 318, orthomosaic function 126b warps the key frames to the ground plane using the corresponding camera pose estimates. All the warped images then will be geometrically aligned on the ground plane. Next, at 320, orthomosaic function 126b determines optimal seams (i.e. simple polygonal curves) in areas where multiple warped images overlap. An optimal seam may be determined as one that passes through image regions with low contrast such that underlying image misalignment is harder to notice in the final result. The optimal seams may be determined by discrete optimization on a 2D pixel grid whose size is decided by the target resolution of the orthomosaic. Next, at 322, using the determined optimal seams, orthomosaic function 126b adjusts the colors of the individual key frames using image editing. At 324 the orthomosaic function 126b then generates the orthomosaic.

Figure 4A:
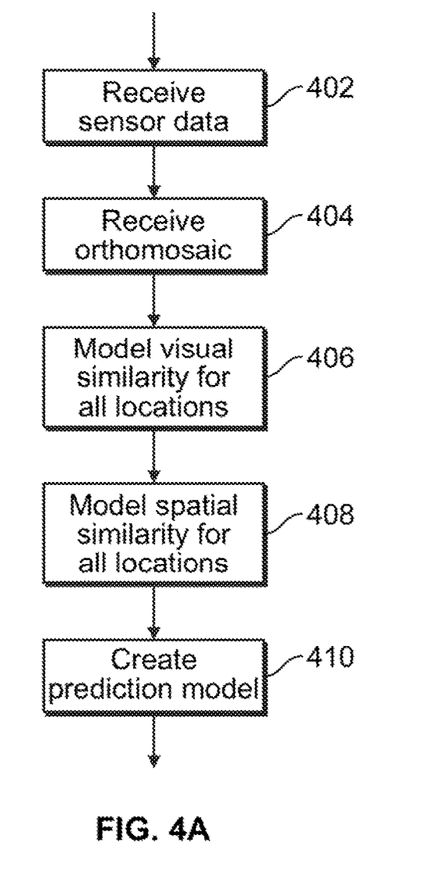
FIG. 4A is a flow diagram illustrating example operations for generating a prediction model.

FIG. 4A is a flow diagram illustrating example operations for generating a prediction model. The example operations of FIG. 4A may be used, for example, in performing operation 208 of FIG. 2A. At 402, precision maps function 126a receives sensor data from sensor interface 124. At 404, precision maps function 126a also receives an orthomosaic from orthomosaic function 126b.

At 406, precision maps function 126a utilizes the orthomosaic to model visual similarity for portions of area 101. This includes determining visual similarity between portions of area 101 that include sensors 107a(1)-sensors 107a(n), and portions of area 101 that do not contain sensors. The visual similarity may be utilized because portions/areas that look similar normally have similar sensor values. For example, a recently irrigated area/portion would look darker and have soil with high moisture content.

Next, at 408, precision maps function 126a models spatial similarity for the portions of area 101. This includes determining spatial similarity or nearness for portions of area 101 that include sensors 107a(1)-sensors 107a(n), and portions of area 101 that do not contain sensors. The spatial similarity may be utilized because the sensors measure parameter levels of physical properties of the soil and the environment. These parameter levels should be similar for areas/portions of area 101 that are nearby or close to each other.

Next, at 410, precision maps function 126a creates a prediction model. The prediction model is created based on probability functions based on the visual similarity and spatial similarity and created using training data. The prediction model may then be used to predict parameter levels in any portion of area 101, including those portions that do not contain any of sensors 107a(1)-107a(n).

Figure 4B:
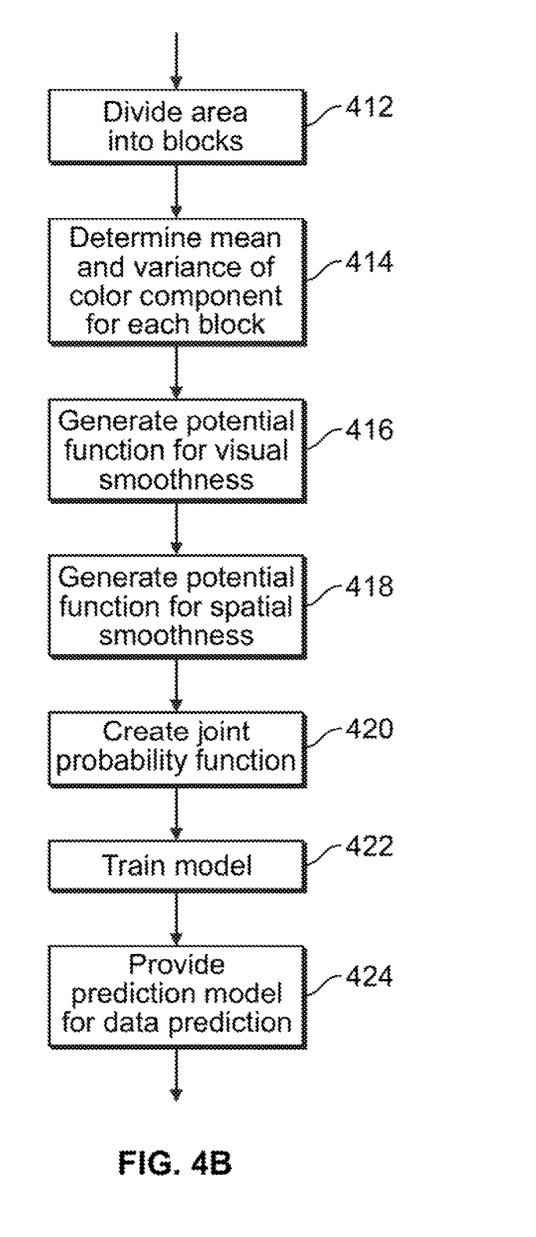
FIG. 4B is a flow diagram illustrating further example operations for generating a prediction model; and, FIG. 5 is a simplified block diagram illustrating an example gateway.

FIG. 4B is a flow diagram illustrating further example operations that may be used in the process of FIG. 4A for generating a prediction model. At 412 the precision map function 126a divides area 101 into portions. At 414 the precision map function 126a determines the mean and variance of each color component in each portion. The precision map generator 126a then creates a set of N discrete portions, where the visual features of a portion i are denoted by n-dimensional vector, $x_i$. Further, the sensor value corresponding to the portion i is defined as $y_i$, where $y_i$ could either be directly observed through a sensor measurement or needs to be inferred by the precision map generator 126a. Then, precision map generator 126a uses w, an n×1 vector to perform a linear transformation of visual features to generate outputs.

At 416, precision map generator 126a incorporates the visual smoothness described above by defining the corresponding potential function for visual smoothness as:

$$e^{\frac{-\|w^T x_i - y_j\|^2}{2\sigma^2}}$$

Next, at 418, precision map generator 126a creates a value, D, to denote the N×N matrix such that:

$$D_{ij} = e^{\frac{-\|p_i - p_j\|^2}{2\sigma^2}}$$

where $p_i$ is the two-dimensional position coordinates for location i.

Next, at 418, in order to incorporate the spatial smoothness constraint, precision map generator 126a creates another term for the joint probability function:

$$e^{\frac{-D_{ij}(y_i-y_j)^2}{2\chi^2}}$$

At 420, precision map generator 126a then determines the joint probability defining the prediction model of system as:

$$P(\{X_{i=1}^N\}, \{y_{i=1}^N\}, W, K_\chi, \sigma) \propto$$
$$P(W) \prod_i e^{\frac{-\|w^T x_i - y_i\|^2}{2\sigma^2}} \prod_{i,j} e^{\frac{-D_{ij}(y_i-y_j)^2}{2\chi^2}}$$

where P(W) is a uniform prior on W added as a regularization term to this probability function.

Next, at 422, the model may be trained. Training and inference for this model may follow standard Gaussian processes. In the training phase, the value of w is learned from training data and may then be used to predict the sensor output y on any data point. The value of the hyper-parameters $\sigma$ and $\chi$ are chosen such that they maximize the likelihood of the observed data, $P(\{X_{i=1}^N\}, \{y_{i=1}^N\}$. At 424 the prediction model may then be provided for data prediction. Once the sensor values at all the data points are known or inferred, a precision map may be generated from the data points.

Figure 5:
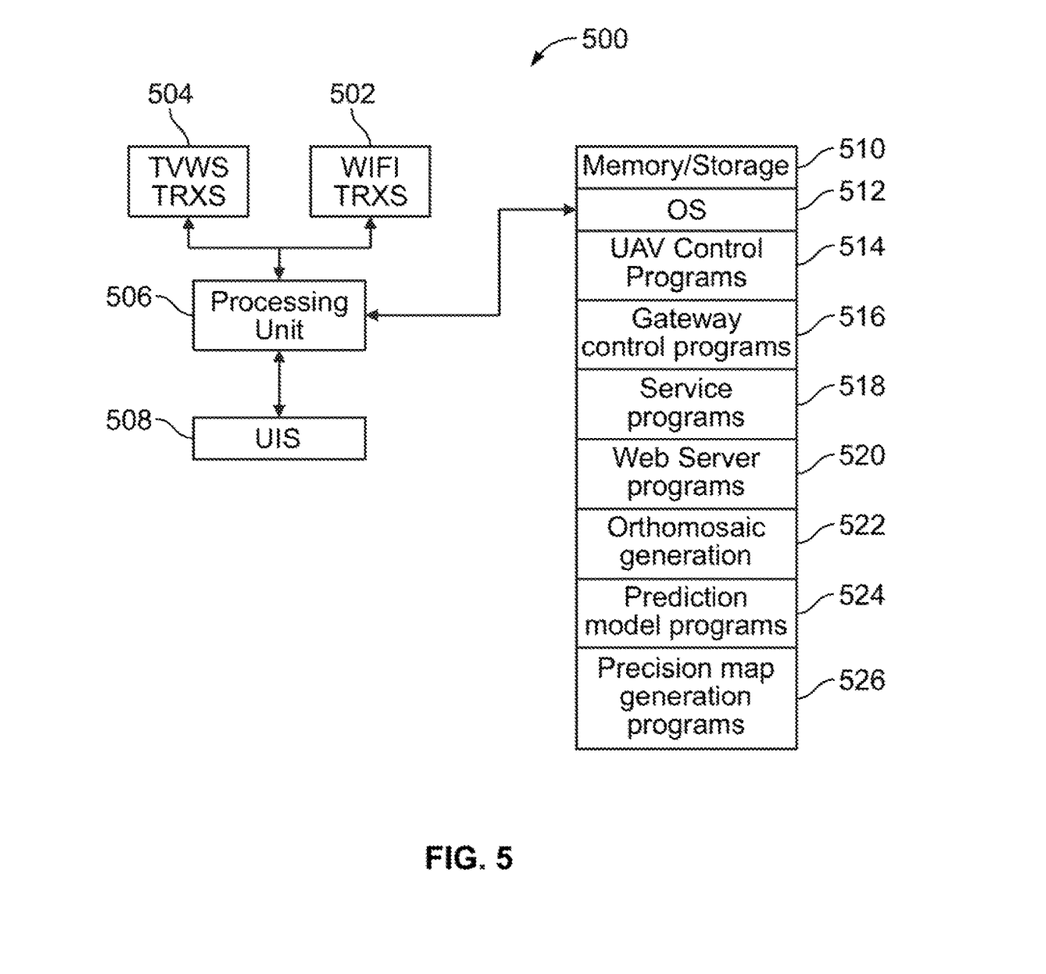

FIG. 5 is a simplified block diagram of an example gateway 500. The functions of gateway 500 may be implemented in an apparatus such as gateway 102 of FIG. 1B. Gateway 500 may include a processing unit 506, memory/storage 510, TVWS transceivers (TVWS TRXS) 504, Wi-Fi transceivers (Wi-Fi TRXS) 502, and user interfaces (UIS) 508. Wi-Fi TRXS 502 may support communications such as communications with cloud network 116 and computing devices 144 over, respectively, interfaces 110 and 148 of FIG. 1B. TVWS TRXS 504 may support communications with sensors 107a(1)-107(n) and UAV 107b over, respectively, interfaces 106a and 106b in order to receive sensor data and video data. In another implementation, communications with sensors 107a(1)-107(n) and UAV 107b may be implemented over interfaces 106a and 106b using Wi-Fi TRXS 502. UIS 508 provide an interface that allows a gateway user to exchange control/configuration information with gateway 500. UIS 508 may be implemented as part of gateway 500 or may be implemented through use of devices, such as computing devices 144.

Memory/storage 510 may be implemented as any type of computer readable storage media, including non-volatile and volatile memory. Memory/storage 510 is shown as including operating system (OS) 512, UAV control programs 514, gateway control programs 516, service programs 518, web server programs 520, orthomosaic generation programs 522, prediction model programs 524, and precision map programs 526. Processing unit 506 may comprise one or more processors, or other control circuitry, or any combination of processors and control circuitry that provide overall control of gateway 500 according to the disclosed embodiments.

Gateway control programs 516 may cause processing unit 506 to control gateway 500 to provide overall manage and coordination for functions described for gateway 102 in FIGS. 2A though 4B. Orthomosaic generation programs 522 may cause processing unit 506 to control gateway 500 to provide functions for creating an orthomosaic as described for FIGS. 3A and 3B. Prediction model programs 524 may cause processing unit 506 to control gateway 500 to provide functions for creating a prediction model as described for FIGS. 4A and 4B. Precision map programs 526 may cause processing unit 506 to control gateway 500 to provide functions for creating precision maps as described for FIGS. 2A and 2B.

Service programs 518 may cause processing unit 506 to control gateway 500 to provide the service functions 128 described in relation to FIG. 1B. Web server programs 520 may cause processing unit 506 to control gateway 500 to provide the functions of web server 130 described in relation to FIG. 1B. UAV control programs 514 may implement UAV flight planner 146 of FIG. 1B in gateway 500. In other implementations UAV flight planner may be a separate device.

The example embodiments disclosed herein may be described in the general context of processor-executable code or instructions stored on memory that may comprise one or more computer readable storage media (e.g., tangible non-transitory computer-readable storage media such as memory 510). As should be readily understood, the terms "computer-readable storage media" or "non-transitory computer-readable media" include the media for storing of data, code and program instructions, such as memory 510, and do not include portions of the media for storing transitory propagated or modulated data communication signals.

While implementations have been disclosed and described as having functions implemented on particular wireless devices operating in a network, one or more of the described functions for the devices may be implemented on a different one of the devices than shown in the figures, or on different types of equipment operating in different systems.

Embodiments have been disclosed that include an apparatus comprising, one or more processors and memory in communication with the one or more processors. The memory comprises code that, when executed, causes the one or more processors to control the apparatus to receive video data representing an aerial view of an area, receive sensor data, the sensor data generated from a plurality of sensor readings, each indicating a level of a parameter in one of a plurality of first portions of the area, generate an orthomosaic from the video data, generate a prediction model using the orthomosaic and the sensor data, extrapolate the sensor data to determine a level of the parameter in each of a plurality of second portions of the area using the prediction model, and generate a map of the area, the map including data displayable to indicate the level of the parameter in each of the first and second portions of the area. The parameter may include a heat measurement and the map may include a heat map of the area. The parameter may include a moisture measurement and the may map include a moisture map of the area. The parameter may include an acidity measurement and the map may include an acidity map of the area. The sensor data may comprises first sensor data, the plurality of sensor reading may comprise a plurality of first sensor readings, the level of a parameter may comprise a first level of a parameter, and the code may further causes the one or more processors to control the apparatus to receive second sensor data, the second sensor data generated from a plurality of second sensor readings, each indicating a second level of a parameter in one of the plurality of first portions of the area, extrapolate the second sensor data to determine a second level of the parameter in each of the plurality of second portions of the area using the prediction model, and update the map of the area, the map displayable to indicate the second level of the parameter in each of the first and second portions of the area.

The code may further cause the one or more processors to generate the orthomosaic by controlling the one or more processors to align each of a plurality of images in the video data, and stitch the plurality of aligned images together to generate the orthomosaic. The code may further cause the one or more processors to align each of the plurality of images by controlling the apparatus to sample a plurality frames from the video data, and generate 3D position data and 3D orientation data corresponding to each of the plurality of frames, and 3D point data corresponding to a scene of the area. The code may further causes the one or more processors to stitch the plurality of images together by controlling the apparatus to fit a ground plane to the 3D point data, warp each of the plurality of frames to the ground plane to create a plurality of warped images, determine optimal seams in areas where of the plurality of warped images overlap, and adjust colors of each of the plurality of frames using the optimal seams. The code may further cause the one or more processors to generate the prediction model by controlling the apparatus to determine visual similarities of areas in the first and second portions, determine spatial similarities of areas in the first and second portions, and generate a prediction model for a level of the parameter in each of a plurality of second portions from the visual and spatial similarities of the areas in the first and second portions. The code may further cause the one or more processors to determine visual similarity by controlling the apparatus to determine a mean and variance of color of each of the areas in the first and second portions, and determine visual similarities of the areas in the first and second portions from the mean and variance of color in each of the areas.

The disclosed embodiments also include an apparatus comprising one or more processors and memory in communication with the one or more processors. The memory comprises code that, when executed, causes the one or more processors to control the apparatus to receive video data representing an aerial overview of an area, determine a plurality of images from the video data, align each of a plurality of images, stitch the plurality of aligned images together, and generate an orthomosaic from the stitched plurality of images, the orthomosaic displayable to provide a geo-referenced image of the area. The code further causes the one or more processors to align each of the plurality of images by controlling the apparatus to sample a plurality frames from the video data, and generate 3D position data and 3D orientation data corresponding to each of the plurality of frames, and 3D point data corresponding to a scene of the area. The code further causes the one or more processors to stitch the plurality of images together by controlling the apparatus to fit a ground plane to the 3D point data, warp each of the plurality of frames to the ground plane to create a plurality of warped images, determine optimal seams in areas where of the plurality of warped images overlap, and adjust colors of each of the plurality of frames using the optimal seams. The apparatus may be implemented in a gateway connected to a cloud network, and the code may further cause the one or more processors to control the apparatus to store the video data at the gateway and send the orthomosaic to the cloud network.

The disclosed embodiments further include an apparatus comprising one or more processors and memory in communication with the one or more processors. The memory comprises code that, when executed, causes the one or more processors to control the apparatus to receive sensor data, the sensor data generated from a at least one sensor reading, each indicating a level of a parameter in one of at least one first portion of an area, generate a prediction model using the sensor data together and an orthomosaic of the area, extrapolate the sensor data to determine a level of the parameter in each of at least one second portion of the area using the prediction model, and generate a map of the area, the map displayable to indicate the level of the parameter in each of the at least one first and at least one second portion of the area. The code may further causes the one or more processors to process the sensor data together with the orthomosaic by controlling the apparatus to determine visual similarities of areas in the at least one first and at least one second portion, determine spatial similarities of areas in the at least one first and at least one second portion, and generate a prediction model for a level of the parameter in each of the at least one second portion from the visual and spatial similarities of the areas in the at least one first and at least one second portion. The apparatus may further comprise a plurality of sensors each configured in the at least one first portions of the area, wherein the code causes the one or more processors to receive the sensor data from the plurality of sensors. The parameter may include an acidity measurement and the map may include an acidity map of the area. The parameter may include a heat measurement and the map may include a heat map of the area. The apparatus may include a moisture measurement and the map may include a moisture map of the area.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any appropriate functional blocks, type of processor, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLD s), etc. Use of the term processor or processing unit in this disclosure is meant to include all such implementations.

Also, although the subject matter has been described in language specific to structural features and/or methodological operations or acts, it is to be understood that the subject matter defined in the appended claims is not necessarily limited to the specific features, operations, or acts described above. Rather, the specific features, operations, and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may or combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. An apparatus, the apparatus comprising:
one or more processors; and,
memory in communication with the one or more processors, the memory comprising code that, when executed, causes the one or more processors to control the apparatus to:
receive video data representing an aerial view of an area;
receive sensor data, the sensor data generated from a plurality of sensor readings, each indicating a level of a parameter in one of a plurality of first portions of the area;
generate an orthomosaic from the video data;
generate a prediction model using the orthomosaic and the sensor data;
extrapolate the sensor data to determine a level of the parameter in each of a plurality of second portions of the area using the prediction model; and,
generate a map of the area, the map displayable to indicate the level of the parameter in each of the first and second portions of the area.

2. The apparatus of claim 1, wherein the parameter includes a heat measurement and the map includes a heat map of the area.

3. The apparatus of claim 1, wherein the parameter includes a moisture measurement and the map includes a moisture map of the area.

4. The apparatus of claim 1, wherein the parameter includes an acidity measurement and the map includes an acidity map of the area.

5. The apparatus of claim 1, wherein the sensor data comprises first sensor data, the plurality of sensor reading comprises a plurality of first sensor readings, the level of a parameter comprises a first level of a parameter, and the code further causes the one or more processors to control the apparatus to:
receive second sensor data, the second sensor data generated from a plurality of second sensor readings, each indicating a second level of a parameter in one of the plurality of first portions of the area;
extrapolate the second sensor data to determine a second level of the parameter in each of the plurality of second portions of the area using the prediction model generated from the orthomosaic and the first sensor data; and,
update the map of the area, the map displayable to indicate the second level of the parameter in each of the first and second portions of the area.

6. The apparatus of claim 1, wherein the code further causes the one or more processors to generate the orthomosaic by controlling the one or more processor to:
align each of a plurality of images in the video data; and,
stitch the plurality of aligned images together to generate the orthomosaic.

7. The apparatus of claim 6, wherein the code further causes the one or more processors to align each of the plurality of images by controlling the apparatus to:
sample a plurality frames from the video data; and,
generate 3D position data and 3D orientation data corresponding to each of the plurality of frames, and 3D point data corresponding to a scene of the area.

8. The apparatus of claim 7, wherein the code further causes the one or more processors to stitch the plurality of images together by controlling the apparatus to:
fit a ground plane to the 3D point data;
warp each of the plurality of frames to the ground plane to create a plurality of warped images;
determine optimal seams in locations where of the plurality of warped images overlap; and,
adjust colors of each of the plurality of frames using the optimal seams.

9. The apparatus of claim 1, wherein the code further causes the one or more processors to generate the prediction model by controlling the apparatus to:
determine visual similarities of the first and second portions;
determine spatial similarities of the first and second portions; and,
generate a prediction model for a level of the parameter in each of a plurality of second portions from the visual and spatial similarities of the first and second portions.

10. The apparatus of claim 9, wherein the code further causes the one or more processors to determine visual similarity by controlling the apparatus to:
determine a mean and variance of color of each of the first and second portions; and,
determine visual similarities of the first and second portions from the mean and variance of color in each of the first and second portions.

11. The apparatus of claim 1, wherein apparatus is implemented in a gateway device communicating with one or more cloud devices and the code further causes the one or more processors to control the apparatus to:
repeatedly receive and update the sensor data;
send the updated sensor data to the one or more cloud devices at first time intervals;
repeatedly receive updated video data and generate an updated orthomosaic; and,
send the updated orthomosaic to the one or more cloud devices at second time intervals when it is updated, wherein the second time intervals are longer than the first time intervals.

12. The apparatus of claim 11, wherein the code further causes the one or more processors to control the apparatus to:
update the predication model each time the orthomosaic is updated; and,
send the prediction model to the one or more cloud devices at the second time intervals.

13. An apparatus comprising:
one or more processors; and,
memory in communication with the one or more processors, the memory comprising code that, when executed, causes the one or more processors to control the apparatus to:
receive sensor data, the sensor data generated from at least one sensor reading, each indicating a level of a parameter in one of at least one first portion of an area;
generate a prediction model using the sensor data and an orthomosaic of the area;
extrapolate the sensor data to determine a level of the parameter in each of at least one second portion of the area using the prediction model; and,
generate a map of the area, the map displayable to indicate the level of the parameter in each of the at least one first and at least one second portion of the area.

14. The apparatus of claim 13, wherein the code further causes the one or more processors to generate the prediction model by controlling the apparatus to:
determine visual similarities of the at least one first and at least one second portion;

determine spatial similarities of the at least one first and at least one second portion;

generate a prediction model for a level of the parameter in each of the at least one second portion from the visual and spatial similarities of the at least one first and at least one second portion.

15. The apparatus of claim 13 further comprising a plurality of sensors each configured in the at least one first portions of the area, wherein the code causes the one or more processors to receive the sensor data from the plurality of sensors.

16. The apparatus of claim 13, wherein the parameter includes a heat measurement and the map includes a heat map of the area.

17. The apparatus of claim 13, wherein the parameter includes a moisture measurement and the map includes a moisture map of the area.

18. A method comprising:

receiving sensor data, the sensor data generated from at least one sensor reading, each indicating a level of a parameter in one of at least one first portion of an area;

generating a prediction model using the sensor data and an orthomosaic of the area;

extrapolating the sensor data to determine a level of the parameter in each of at least one second portion of the area using the prediction model; and, generating a map of the area, the map displayable to indicate the level of the parameter in each of the at least one first and at least one second portion of the area.

19. The apparatus of claim 13, wherein the parameter includes an acidity measurement and the map includes an acidity map of the area.

20. The method of claim 18, wherein the parameter includes a heat measurement and the map includes a heat map of the area.

21. The method of claim 18, wherein the parameter includes a moisture measurement and the map includes a moisture map of the area.

22. The method of claim 18, wherein the parameter includes an acidity measurement and the map includes an acidity map of the area.

* * * * *